United States Patent [19]

Sharaby

[11] Patent Number: 4,797,458
[45] Date of Patent: Jan. 10, 1989

[54] COLLOIDAL STABLE VINYL HALIDE POLYMERIZATIONS WITH MERCAPTAN CHAIN TRANSFER AGENTS

[75] Inventor: Zaev Sharaby, University Heights, Ohio

[73] Assignee: The B.F. Goodrich Company, Akron, Ohio

[21] Appl. No.: 902,714

[22] Filed: Sep. 2, 1986

[51] Int. Cl.$^4$ .............................. C08F 2/20; C08F 2/38
[52] U.S. Cl. ..................................... 526/194; 526/209; 526/210; 526/211; 526/213; 526/214; 526/224
[58] Field of Search ............... 526/194, 209, 210, 211, 526/213, 214, 216, 224, 220

[56] References Cited

U.S. PATENT DOCUMENTS

| | | | |
|---|---|---|---|
| 1,950,438 | 3/1934 | Carothers, et al. | 526/212 |
| 3,627,820 | 12/1971 | Chujo | 526/224 |
| 3,696,083 | 10/1972 | Hwa | 526/224 |
| 3,706,722 | 12/1972 | Nelson et al. | 526/210 |
| 3,842,056 | 10/1974 | Torigoe et al. | 526/209 |
| 4,013,824 | 3/1977 | Uraneck et al. | 526/205 |
| 4,189,552 | 2/1980 | Kuwata et al. | 526/84 |
| 4,370,252 | 1/1983 | Uraneck et al. | 526/224 |

Primary Examiner—Christopher Henderson
Attorney, Agent, or Firm—Joe A. Powell

[57] ABSTRACT

Polymers of vinyl halides having low molecular weights, good particle characteristics, and improved melt flow are made by aqueous polymerization utilizing an effective amount of a mercaptan as a chain transfer agent, wherein the mercaptan chain transfer agent is mixed with at least one material which is non-polymerizable with vinyl chloride and wherein said non-polymerizable material is substantially insoluble in water and is miscible with said mercaptan to form a chain transfer composition, and said chain transfer composition is added before the start of the polymerization while maintaining colloidal stability.

14 Claims, No Drawings

COLLOIDAL STABLE VINYL HALIDE POLYMERIZATIONS WITH MERCAPTAN CHAIN TRANSFER AGENTS

CROSS REFERENCE TO RELATED APPLICATIONS

Application Ser. Nos. 6/854,203 and 6/854,204 both filed on Apr. 21, 1986 in the name of Zaev Sharaby.

BACKGROUND OF THE INVENTION

Low molecular weight polymers of vinyl halides, such as vinyl chloride, have found wide acceptance in the marketplace.

The demand for specialty polyvinyl chloride resin for use in custom injection molding (CIM) applications initiated research for PVC resins having high melt flow and low molecular weight, without any corresponding adverse effects on heat stability, heat distortion and related properties. The use of low levels of comonomers, such as vinyl acetate, with vinyl chloride to form a PVC copolymer substantially improves the melt flow properties. Further molecular weight reductions are needed and also it would be desirable to have a low molecular weight homopolyer. Copolymers are not always as desirable as homopolymers for clarity or certain other desirable properties. The molecular weight reduction is accomplished through the practice of this invention by the use of novel chain transfer compositions.

Mercaptan compounds are known as efficient chain transfer agents. One of the most efficient chain transfer agents in the family of mercaptans is 2-mercaptoethanol. It is more effective than other conventional chlorinated chain transfer agents, such as trichloroethylene. U.S. Pat. No. 4,189,552, which is herein incorporated by reference, discloses the use of 2-mercaptoethanol in the suspension polymerization of vinyl chloride with 2-mercaptoethanol levels of 0.001 to 0.50 parts per 100 parts of monomer. The '552 patent teaches that the introduction of the mercapto compounds into the reaction medium at a time when the monomer conversion is lower than 1% produces adverse effects on particle characteristics. Because of the detrimental effects that mercapto compounds have on colloidal stability, the '552 patent instructs that the mercapto compounds should be introduced by divided addition during the polymerization In essence, 2-mercaptoethanol at levels greater than 0.03 part per 100 parts monomer, charged before the onset of the polymerization, is likely to cause an unacceptable coarse or solid charge.

It is a desirable goal to be able to use highly efficient mercaptan chain transfer agents, such as 2-mercaptoethanol, at high levels and without resorting to step wise addition while maintaining the colloidal stability of an aqueous polymerization reaction.

SUMMARY OF THE INVENTION

It is an object of this invention to provide chain transfer compositions.

It is another object of this invention to provide low molecular weight polymers by using the new chain transfer compositions.

It is a further object of this invention to provide processes which use the chain transfer compositions to produce low molecular weight polymers.

These and other objects of this invention which will become evident from the disclosure herein are accomplished by polymerizing monomers in the presence of a chain transfer composition comprising (a) at least one mercaptan chain transfer agent and
(b) at least one non-polymerizable material which is miscible with the mercaptan chain transfer agent and is substantially insoluble in water.

Excellent colloidal stability is achieved in aqueous suspension reactions even when large amounts of the chain transfer composition are added to the polymerization medium prior to the start of polymerization. The use of the chain transfer composition enables the production of low molecular weight homopolymers and copolymers having an inherent solution viscosity of about 0.10 and higher.

DETAILED DESCRIPTION OF THE INVENTION

The process of this invention will be described for a suspension polymerization of vinyl chloride to form a PVC homopolymer, but, of course, is not limited to such and can be easily extended to other aqueous processes, such as emulsion and microsuspension, as well as vinyl copolymers and other materials by those skilled in the art.

In the practice of this invention, relatively low molecular weight polymers of vinyl or vinylidene halides are prepared by aqueous polymerization utilizing a chain transfer composition. While the present invention is specifically illustrated hereinafter with regard to the suspension polymerization of vinyl chloride, it is to be understood that the process may likewise be applied to the aqueous suspension, microsuspension or emulsion polymerization of any polymerizable vinyl or vinylidene halides, such as vinyl bromide, vinylidene chloride, and any other vinylidene halides having at least one terminal $CH_2=C<$ group.

The term vinyl polymer as used herein includes homopolymers, as well as copolymers made from two or more copolymerizable monomers. Preferably, the vinyl polymer is a polyvinyl chloride homopolymer When copolymers are provided, vinyl chloride may be copolymerized with up to 50% of one or more other copolymerizable monomers. Examples of such copolymerizable monomers are the $\alpha,\beta$-olefinically unsaturated carboxylic acids, such as acrylic acid, methacrylic acid, ethacrylic acid, $\alpha$-cyanoacrylic acid, and the like; maleic and fumaric acid and esters thereof; esters of acrylic acid, such as methyl acrylate, ethyl acrylate, butyl acrylate, octyl acrylate, cyanoethyl acrylate, and the like; esters of methacrylic acid; nitriles, such as acrylonitrile and methacrylonitrile; acrylamides, such as methyl acrylamide, N-methylol acrylamide, N-butoxy methacrylamide, and the like; vinyl ethers, such as ethylvinyl ether, chloroethyl vinyl ether, and the like; the vinyl ketones, styrene, and styrene derivatives, including $\alpha$-methyl styrene, vinyl naphthalene, allyl and vinyl chloroacetate, vinyl acetate, vinyl pyridine, methyl vinyl ketone; olefins such as ethylene and propylene; and other copolymerizable monomers of the types known to those skilled in the art.

The term polymers as used herein includes homopolymers, copolymers and terpolymers.

It has been surprisingly discovered that the polymerization of vinyl chloride can be carried out with as much as 5.00 parts of a water soluble mercaptan per 100 parts monomer without loss of colloidal stability.

The present invention relates to a process for the aqueous polymerization of vinyl halides. The polymerization is carried out using a chain transfer composition. This novel process yields a polymer having low molecular weight, improved melt flow properties and good particle characteristics. The polymer product finds particular utility in custom injection molding applications.

The primary objective of this invention is to produce vinyl halide homopolymers and copolymers having a low molecular weight, improved melt flow, and good particle size and particle size distribution. The polymers of the present invention ideally have an average particle size of about 80 to about 400 microns, preferably from about 80 to about 150 microns, if made by the suspension process. The average particle size of the vinyl resins can be measured by a Sonic Sifter Screen Method following ASTM Procedure No. D-1921-63. The polymers of this invention have an inherent solution viscosity in the range of about 0.10 and higher. The preferred inherent solution viscosity is in the range of from about 0.10 to about 0.55. The inherent viscosity represents a measure of the polymeric molecular weight and may be tested following ASTM Procedure No. D-1243-66. The polymer's inherent viscosity is also dependent on the polymerization temperature. The higher the polymerization temperature the lower the inherent viscosity. With the process of this invention the polymerization temperature may be held constant while the inherent viscosity is lowered by the use of chain transfer agents.

The process of this invention uses a chain transfer composition comprising (a) at least one mercaptan chain transfer agent and (b) at least one non-polymerizable material which is miscible with the mercaptan chain transfer agent. Suitable mercaptans for the practice of this invention include water soluble mercaptans such as 2-mercaptoethanol, 3-mercaptopropanol, thiopropyleneglycol, thioglycerine, thioglycolic acid, thiohydracrylic acid, thiolactic acid and thiomalic acid, and the like. Suitable non-water soluble mercaptans include isooctyl thioglycolate, n-butyl 3-mercaptopropionate, n-butyl thioglycolate, glycol dimercaptoacetate, trimethylolpropane trithioglycolate, alkyl mercaptans, and the like. The preferred mercaptan for use in the present invention is 2-mercaptoethanol, however, any chain transfer agent having a mercapto (—SH) group would be acceptable.

The chain transfer composition of this invention comprises, in addition to the mercaptan, at least one non-polymerizable material which is miscible with the mercaptan and is substantially insoluble in water. The term non-polymerizable as used herein means that the material does not form a part of the vinyl polymer chain in the sense that a traditional comonomer would form. The non-polymerizable material may, in some cases, graft polymerize onto the vinyl polymer chain but this is not normally considered a copolymer. The term substantially insoluble in water as used in this specification means that the material has less than 5% solubility in water. The non-polymerizable material may be a monomer, oligomer or a polymer. Suitable non-polymerizable materials include dioctyl phthalate, low molecular weight poly(caprolactone), polysilicones, esters of glycerols, polyesters, water insoluble esters of fatty acids with —OH terminated polyoxyethylene and polyoxypropylene, esters of polyols, esters of monoacids and polyacids, esters of organic polyphosphates, phenyl ethers, ethoxylated alkylphenols, sorbitan monostearate and sorbitan monooleate and other sorbitol esters of fatty acids. The choice of material is not critical as long as the material is non-polymerizable with vinyl chloride and is substantially insoluble in water.

The chain transfer composition must contain at least enough non-polymerizable material to encapsulate the mercaptan chain transfer agent. This amount varies according to the type and amount of chain transfer agent used. Usually, the chain transfer composition must contain at least an equal amount in weight of non-polymerizable material as chain transfer agent in order to encapsulate or host the chain transfer agent Preferably, the composition contains at least twice as much weight of non-polymerizable material as chain transfer agent Other non-essential ingredients may be used in the chain transfer compositions of this invention but are not preferred.

The chain transfer compositions are formed by mixing the two essential ingredients together. The method used to mix the ingredients is not critical and may be any of the known methods used by those skilled in the art. The ingredients may even be charged to the polymerization reactor and mixed before adding the other polymerization ingredients but is preferably mixed outside the reactor.

Because of the detrimental effects that mercaptans, such as 2-mercaptoethanol have on colloidal stability, it is necessary to mix the 2-mercaptoethanol with the non-polymerizable material before adding it to the reaction medium. The non-polymerizable material serves as a host material for the chain transfer agent. This procedure surprisingly eliminates the adverse effects of 2-mercaptoethanol on colloidal stability. It is believed that the non-polymerizable material averts the adverse effect of 2-mercaptoethanol on colloidal stability via encapsulation, complexation or interaction and, thus, allows relatively high levels of 2-mercaptoethanol to be introduced to the reaction medium prior to the start of polymerization. The term "encapsulation" as used herein is not intended as the traditional meaning of encapsulation which is to coat or contain and the result is a heterogenous system. The chain transfer composition of this invention is homogenous.

The level of chain transfer composition used to make the low molecular weight polymers of this invention will be described in terms of the level of mercaptan in the composition. The level of mercaptan used is greater than 0.03 part by weight per 100 parts by weight of vinyl monomer. The preferred levels of mercaptan for the practice of the present invention range from about 0.03 to about 5.00 parts by weight per 100 parts monomer, and, preferably, from 0.20 to 1.50 parts.

When high amounts of mercaptan, such as 2-mercaptoethanol, are used, it is desirable to not charge the entire amount of chain transfer agent at the beginning of polymerization 2-mercaptoethanol has a diminishing effect on molecular weight above about the 1.5 parts level. Therefore, if, for example, 3.0 parts were used, it would be advisable to add only up to 1.5 parts at the beginning of polymerization and to gradually add the remainder during polymerization. With this invention, amounts added at the beginning which are greater than 1.5 parts do not result in colloidal instability. However, for the most efffficient use of chain transfer agent, it is preferred to not add more than 1.5 parts before the beginning of polymerization. This preferred initial level could, of course, be different for different mercaptans. The above described preferred procedure is for 2-mercaptoethanol.

If less than 0.25 part by weight of chain transfer agent is used, then all of the chain transfer agent will be added in the form of the chain transfer composition before the beginning of polymerization. If more than 0.25 part is used, then at least 0.25 part will be added in the form of the chain transfer composition before the beginning of polymerization and the remainder may be added later. To gain the most efficiency of the chain transfer agent, no more than 1.5 parts by weight should be added before the start of polymerization. For best results, at least 50% of the chain transfer agent, preferably 100%, is added to the polymerization medium prior to the start of polymerization. Any amount not added at the start and not encapsulated shold be added after the polymerization has reached about 10% conversion to maintain colloidal stability. Except for the use of the chain transfer composition, the polymerization is much the same as in the conventional polymerization of vinyl chloride in an aqueous medium.

Suitable dispersing agents or suspending agents, such as known in the art, may be used. Examples of suitable dispersants are partially hydrolyzed polyvinyl alcohol, cellulose ethers, starch, gelatin, and the like. The level of dispersant used will be less than about 2.0 parts by weight, preferably less than about 0.5 part by weight per 100 parts by weight of monomer. Excellent results are obtained with from 0.05 to 0.3 part by weight of dispersant per 100 parts by weight of monomer.

The process of this invention uses polymerization initiators. The polymerization initiators used in this process are known in the art and are selected from the conventional free radical initiators such as organic peroxides and azo compounds. The particular free radical initiator employed will depend upon the monomeric material(s) being polymerized, the molecular weight and color requirements of the polymer, the temperature of polymerization, and the type of process such as suspension or emulsion process, etc. Insofar as the amount of initiator employed is concerned, it has been found that an amount in the range of about 0.005 part by weight to abut 1.00 part by weight, based on 100 parts by weight of the monomer or monomers being polymerized, is satisfactory. However, it is preferred to employ an amount of initiator in the range of about 0.01 part by weight to abut 0.20 part by weight based on 100 parts by weight of monomer(s). For the process as described herein, examples of suitable initiators include lauroyl peroxide, azobisisobutylonitrile, benzoyl peroxide, isopropyldicarbonate, acetyl cyclohexyl sulfonyl peroxide, t-butyl peroxypivalate, t-butyl peroxyactoate, and α-cumyl peroxyneodecanoate, the choice depending on the reaction temperature. The preferred initiator is a dual system comprising t-butyl peroxypivalate and α-cumyl peroxyneodecanate. This initiator system results in a reduced residual initiator level in the final product and a shorter high temperature history due to faster reactions.

The suspension polymerization process of this invention may be carried out at any temperature which is normal for the monomeric material to be polymerized. Preferably, a temperature in the range of about 0° C. to about 100° C., more preferably from about 50° C. to about 80° C., is employed. In order to facilitate temperature control during the polymerization process, the reaction medium is kept in contact with cooling surfaces cooled by water, brine, evaporation, etc. This is accomplished by employing a jacketed polymerization reactor wherein the cooling material is circulated through the jacket throughout the polymerization reaction. This cooling is necessary since most all of the polymerization reactions are exothermic in nature. It is understood, of course, that a heating medium can be circulated through the jacket, if necessary.

To further illustrate the present invention, the following specific examples are given, it being understood that this is merely intended in an illustrative and not a limitative sense. In the examples, all parts and percentages are by weight unless othewise indicated.

EXAMPLES

Examples 1 through 14 are aqueous suspension polymerizations which are presented to show this invention as used to produce a PVC homopolymer. The recipe used for the polymerizations is shown in Table 1 below. In all examples, a reactor vessel was used which was equipped with agitation and cooling means.

TABLE 1

| Material | Parts by Weight |
|---|---|
| Vinyl Chloride | 100 |
| Water (demineralized) | 150 |
| Hydroxyalkyl Cellulose | 0.15 (0.10 for Examples 1 to 6) |
| Polyvinyl Alcohol | 0.10 |
| Initiator | Variable (0.11 to 0.17) |
| Chain Transfer Composition | |
| Non-Polymerizable material | Variable (0.30 to 5.0) |
| 2-mercaptoethanol | Variable (0.1 to 3.00) |

As can be seen from Table 1, the variables are the initiator level, the amount of 2-mercaptoethanol chain transfer agent in the chain transfer composition, and the type and amount of non-polymerizable material in the chain transfer composition. The initiator level is adjusted upward as the amount of 2-mercaptoethanol is increased to account for the reaction retardation caused by 2-mercaptoethanol. There is also a slight variance in the amount of hydroxyalkyl cellulose surfactant because in Examples 1 through 6 a 3-liter size reactor was used whereas in Examples 7 through 14 a 55-liter size reactor was used. In all Examples the 2-mercaptoethanol was mixed with the non-polymerizable material to form the chain transfer composition. The chain transfer composition was charged to the reactor after charging water.

Table 2 shows the type and amount of non-polymerizable material and the level of 2-mercaptoethanol used in the chain transfer composition. The initiator level is also shown. The properties of the resin produced are also shown. I.V. is an indication of molecular weight. Average particle size distribution are also shown.

TABLE 2

| Example | Chain Transfer Composition | | | | Resin Properties | | |
|---|---|---|---|---|---|---|---|
| | Non-Polymerizable Material | | 2-Mercaptoethanol | | | | |
| | Type | Level | Level | Initiator Level | I.V.[5] | APS (micron)[6] | PSD %[7] |
| 1 (Control) | — | — | — | 0.05 | 0.68 | 172 | 21 |
| 2 | Oligosilicone PS 340[1] | 2.5 | 0.5 | 0.13 | 0.335 | 52 | 24 |

TABLE 2-continued

| | Chain Transfer Composition | | | | Resin Properties | | |
|---|---|---|---|---|---|---|---|
| | Non-Polymerizable Material | | 2-Mercaptoethanol | | | | |
| Example | Type | Level | Level | Initiator Level | I.V.[5] | APS (micron)[6] | PSD %[7] |
| 3 | Oligosilicone PS 197[1] | 2.5 | 0.5 | 0.13 | 0.353 | 75 | 59 |
| 4 | Oligosilicone PS 339.7[1] | 2.5 | 0.5 | 0.13 | 0.331 | 79 | 27 |
| 5 | Polyester[2] | 2.5 | 0.5 | 0.13 | 0.353 | 74 | 45 |
| 6 | Polycapralactone[8] | 1.0 | 0.5 plus (2.5)[9] | 0.22 | 0.212 | 118 | 120 |
| 7 | Polycapralactone[3] | 5.0 | 0.1 | 0.11 | 0.464 | 102 | 49 |
| 8 | Polycapralactone[3] | 2.5 | 0.8 | 0.17 | 0.323 | 104 | 51 |
| 9 | Polycapralactone[4] | 5.0 | 0.1 | 0.11 | 0.476 | 137 | 89 |
| 10 | Polycapralactone[4] | 2.5 | 0.8 | 0.17 | 0.313 | 101 | 53 |
| 11 | Ethoxylated Alkylphenols | 2.5 | 0.5 | 0.15 | 0.343 | 129 | 51 |
| 12 | Sorbitan Monooleate | 2.5 | 0.5 | 0.15 | 0.298 | 76 | 31 |
| 13 | Sorbitan Monostearate | 1.25 | 0.5 | 0.15 | 0.365 | 59 | 60 |
| 14 | Sorbitan Monooleate | 0.34 | 0.17 | 0.10 | 0.454 | 88 | 39 |

[1] Sold by Petrarch Systems, Inc.
[2] Paraplex G-57 from C. P. Hall, Inc.
[3] Tone 310 from Union Carbide
[4] Tone 240 from Union Carbide
[5] Measured according to ASTM D-1243-66
[6] Determined by screen analysis
[7] Determined by screen analysis
[8] Tone L-200 from Union Carbide
[9] Metered after 10% conversion From the data presented in Table 2, it can be seen that low molecular weight (low I.V.) PVC homopolymers can be produced using an aqueous suspension process. All the Examples of reactions for this invention were colloidal stable even though high amounts of 2-mercaptoethanol were used in the reaction in the form of the chain transfer composition.

The polymers produced by this invention may be compounded with other materials such as stabilizers, lubricants, plasticizers, colorants, fillers, and the like, to form a variety of end use products. The polymers find particular utility in custom injection molding applications and powder coatings.

We claim:

1. A process for the production of vinyl halide polymers by aqueous polymerization, comprising the use of a chain transfer composition wherein said chain transfer composition comprises (a) at least one mercaptan chain transfer agent, and (b) at least one material which is characterized by being (i) miscible with said mercaptan, (ii) substantially insoluble in water, and (iii) is non-polymerizable with said vinyl halide; and wherein all of the chain transfer composition is added to the polymerization medium prior to the start of the polymerization reaction.

2. A process of claim 1 wherein the vinyl halide is vinyl chloride.

3. A process of claim 2 wherein the mercaptan is 2-mercaptoethanol.

4. A process of claim 1 wherein the polymerization is carried out at a temperature of from about 50° to about 100° C.

5. A process of claim 4 wherein the polymerization is carried out at a temperature of from about 50° C. to about 80° C.

6. A process of claim 1 wherein the level of mercaptan drain transfer agent in the chain transfer composition is from about 0.05 to about 5.00 parts by weight per 100 parts by weight of vinyl halide monomer.

7. A process of claim 1 wherein the polymers produced have an inherent solution viscosity greater than about 0.10 as measured according to ASTM D 1243-66.

8. A process of claim 1 wherein the non-polymerizable material in said chain transfer composition is selected from the group consisting of polycaprolactone, polysilicone, polyester, esters of polyols, esters of polyacids, phenyl ethers, ethoxylated alkylphenols, sorbitan monostearate, sorbitan monooleate, and sorbitol esters of fatty acids.

9. A process of claim 8 wherein said nonpolymerizable material is selected from the group consisting of sorbitan monooleate, sorbitan monostearate, and sorbitol esters of fatty acids.

10. A process of claim 5 wherein a dual free radical initiator system is used comprising t-butyl peroxypivalate and α-cumyl peroxyneodecanate.

11. An aqueous suspension process for producing homopolymers of vinyl chloride and copolymers of vinyl chloride polymerized with up to 25 parts by weight of at least one other polymerizable monomer per 100 parts by weight of vinyl chloride, comprising using an effective amount of at least one mercaptan chain transfer agent, the improvement comprising encapsulating at least 0.05 part by weight of said chain transfer agent by mixing the entire amount of said chain transfer agent with an encapsulating amount of at least one material which is non-polymerizable with vinyl chloride and wherein said non-polymerizable material is substantially insoluble in water and is miscible with said mecaptan to form an encapsulated mixture and adding said encapsulated mixture to the polymerization medium prior to the start of polymerization.

12. A process of claim 11 wherein the amount of mercaptan used is from about 0.05 to about 5.00 parts by weight per 100 parts by weight of vinyl chloride monomer.

13. A process of claim 12 wherein said mercaptan is 2-mercaptoethanol and the encapsulating amount of said non-polymerizable material is at least equal in weight to the amount of 2-mercaptoethanol.

14. A process of claim 13 wherein the non-polymerizable material in said chain transfer composition is selected from the group consisting of polycaprolactone, polysilicone, polyester, esters of polyols, sters of polyacids, phenyl ethers, ethoxylated alkelphenols, sorbitan monostearate, sorbitan monooleate, and sorbitol esters of fatty acids.

* * * * *